United States Patent [19]

Barre et al.

[11] Patent Number: 5,676,724
[45] Date of Patent: Oct. 14, 1997

[54] METHOD OF IMPROVING THE GEOMETRICAL SHAPE OF A TUBE USED FOR MAKING A PREFORM BY SELECTIVELY ETCHING THE BORE OF THE TUBE

[75] Inventors: Gilles Barre, Saint Michel Sur Orge; Christian Le Sergent, Marcoussis, both of France

[73] Assignee: Alcatel Fibres Optques, Bezons Cedex, France

[21] Appl. No.: 544,209

[22] Filed: Oct. 17, 1995

[30] Foreign Application Priority Data

Oct. 18, 1994 [FR] France .................. 94 12 420

[51] Int. Cl.$^6$ .................. C03B 37/012
[52] U.S. Cl. .................. 65/382; 65/31; 65/429; 46/24; 46/80
[58] Field of Search .................. 65/382, 429, 31, 65/412; 216/24, 80

[56] References Cited

U.S. PATENT DOCUMENTS

| | | | |
|---|---|---|---|
| 4,259,406 | 3/1981 | Borrelli | 65/31 |
| 4,415,404 | 11/1983 | Riegl | 216/80 |
| 4,493,721 | 1/1985 | Auwenda | 65/429 |
| 5,127,929 | 7/1992 | Gunther et al. | |
| 5,152,816 | 10/1992 | Berkey | 216/80 |
| 5,192,350 | 3/1993 | Le Sergent | |

FOREIGN PATENT DOCUMENTS

| | | |
|---|---|---|
| 0091173A1 | 10/1983 | European Pat. Off. |
| 0440130A1 | 8/1991 | European Pat. Off. |
| 0484035A1 | 5/1992 | European Pat. Off. |
| 0519834A1 | 12/1992 | European Pat. Off. |
| 3031160A1 | 4/1982 | Germany. |
| 63-139024 | 6/1988 | Japan .................. 65/429 |
| 2067182A | 7/1981 | United Kingdom. |
| 2122599 | 1/1984 | United Kingdom .................. 65/429 |

OTHER PUBLICATIONS

*Patent Abstracts of Japan*, vol. 11, No. 381 (C-464), Dec. 12, 1987 corresponding to JP-A-62 153136 (Fujikura, Ltd) Jul. 8, 1987.

*Primary Examiner*—John Hoffmann
*Attorney, Agent, or Firm*—Sughrue, Mion, Zinn, Macpeak & Seas, PLLC

[57] ABSTRACT

A method of improving the symmetry of a cylindrical silica tube to be used in making a preform having a circular outside surface eccentric to a circular inside surface thereby providing a varying tube thickness throughout the circumference of the tube which includes the following steps. The first step is locating a longitudinal generator line of the cylindrical tube at a greatest thickness of the tube at a given circumferential point on the tube, and while preventing the tube from rotating, etching in at least one pass the inside of the tube with a gas capable of decomposing silica, while heating the outside of the tube along that longitudinal generator line.

3 Claims, 1 Drawing Sheet

METHOD OF IMPROVING THE GEOMETRICAL SHAPE OF A TUBE USED FOR MAKING A PREFORM BY SELECTIVELY ETCHING THE BORE OF THE TUBE

The present invention relates to a method of improving the symmetrical shape of a silica tube used for making an optical fiber preform, e.g. by implementing the modified chemical vapor deposition (MCVD) method.

BACKGROUND OF THE INVENTION

It is known that an optical fiber may be manufactured by hot-drawing a preform that includes the various optical layers that are to be present in the fiber. Such a preform is obtained from a silica tube by using methods such as the MCVD method.

In order to obtain a high-quality fiber, the tube used to make the preform must be accurately symmetrically shaped, i.e. the inside surface of the tube must be accurately coaxial with the outside surface thereof. The slightest eccentricity is passed on to the finished fiber, and it gives rise both to polarization dispersion in the transmitted signals, and also to losses at connectors.

Heat treatment that enables the various layers making up the core of the preform (and subsequently the core of the optical fiber) to be deposited inside the tube is not identical at all points of the inside surface of the tube since, as a result of asymmetrical differences in the thickness of the tube, the heat treatment, which is applied from outside the tube, does not supply uniform power to the entire inside surface of the tube. Preforms obtained from tubes having such defects have oval cores. A core that is not accurately concentrically in cross-section gives rise to the above-mentioned problems in the fiber, i.e. it causes polarization dispersion in the transmitted signals, and losses at connectors.

Despite all of the precautions that are taken when manufacturing silica tubes, they often have inaccurate asymmetrical shapes in which their inside cylindrical surfaces are eccentric relative to their outside cylindrical surfaces. This defect is generally reproduced along the entire length of a generator line of the tube.

It can be understood that such defects are highly detrimental to the transmission properties of an optical fiber made from a preform that is obtained from such a tube.

OBJECTS AND SUMMARY OF THE INVENTION

An object of the present invention is to provide a method that makes it possible to correct asymmetrical circumferential thickness inaccuracies in the geometrical shape of such a tube silicon, so as to avoid obtaining cores having cross-sections with inside and outside cylindrical surfaces that are not accurately concentrically cylindrical.

The method of the invention includes the following steps:

locating a longitudinal generator line of a silica tube at a greatest thickness of the tube over the circumference of the tube is located;

Preventing the tube from rotating, while etching in at least one pass the inside of the tube with a gas capable of decomposing silica, while heating the outside of the tube at said longitudinal generator line by means of a heating member.

For example, the gas may be one chosen from the group consisting of: $SF_6$, $CF_4$, $CCl_2F_2$, $C_2F_6$, $C_3F_8$, and $SiF_4$.

BRIEF DESCRIPTION OF THE DRAWING

The invention is explained in more detail in the following description of the method of the invention given with reference to the accompanying drawing, in which.

MORE DETAILED DESCRIPTION

Figure 1:
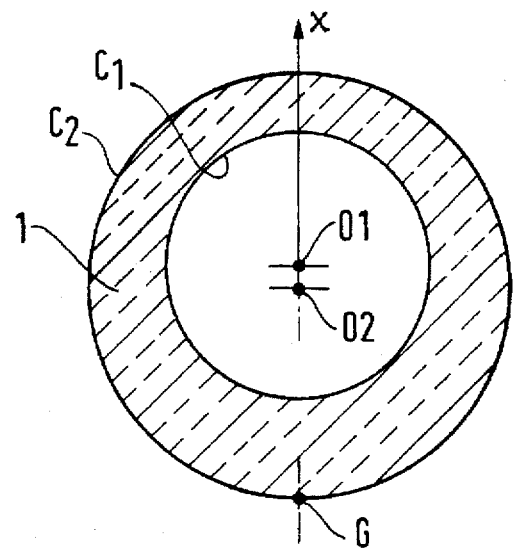
FIG. 1 is a view in section through a silica tube whose geometrical shape is to be improved.

FIG. 1 is a view in cross-section through a silica tube 1 to be used for making a preform. As shown in FIG. 1, the circle $C_2$ defining the outside cylindrical cross-section of the tube is eccentric relative to the circle $C_1$ defining the inside cylindrical cross-section of the tube 1. In the drawing, in which $O_1$ is the center of the inner circle and $O_2$ is the center of the outer circle, the eccentricity $O_1O_2$ is highly exaggerated so as to be visible. In reality, for a tube having, for example, an inside diameter of 2.6 cm and an outside diameter of 3 cm, the eccentricity lies, in general, in the range 20 µm to 200 µm.

In the method of the invention, a longitudinal generator line of the tube facing the greatest circumferential thickness of the tube is located, e.g. by taking a physical or an optical measurement.

The tube is then placed in holding means, such as a glass maker's lathe, so that a given longitudinal generator line G of the tube faces a heating member, e.g. a blow torch. One or more correction passes are made by injecting a gaseous mixture into the tube, the mixture comprising an etching gas such as $SF_6$ (or, in a variant, a fluorine-containing gas such as $CF_4$, $CCl_2F_2$, $C_2F_6$, $C_3F_8$, $SiF_4$, etc.) and oxygen (whenever necessary given the composition of the etching gas), while displacing the blow torch at constant speed along the generator line G. The correction passes are angularly selective depending on the generator line G in question, i.e. the heating member enables heat to be applied over quite a narrow angular sector, e.g. about 60°.

As a result, the surplus thickness of silica in the vicinity of the heated region disappears, the quantity of surplus silica volatilized being proportional both to the flow-rate of $SF_6$ and to the duration of the etching. The surplus silica is volatilized by means of a chemical reaction which, when the etching gas is sulfur hexafluoride $SF_6$, may be written as follows:

$$3Si_2 + 2SF_6 \leftrightarrows 3SiF_4\uparrow + 2SO_2 + O_2$$

Figure 2:
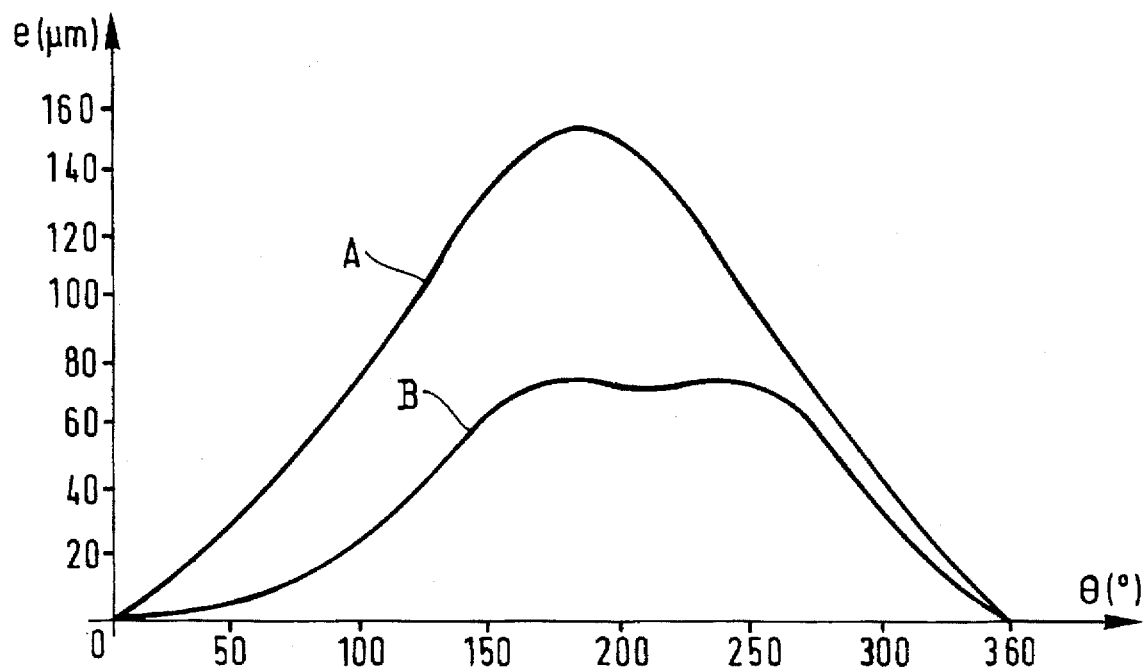
FIG. 2 is a graph showing the improvement to a tube after a plurality of corrective etching passes have been performed using the method of the invention.

An example of the result obtained is shown in FIG. 2 which shows the surplus tube thickness $\underline{e}$ as a function of the angle θ measured from a half-axis $(O_1x)$ in alignment with and opposite from the half-axis $(O_1G)$, The silica tube had a maximum surplus thickness $\underline{e}$ of 160 mm (curve A) along a longitudinal generator line. After three correction passes made at a speed of 0.2 cm/s, with a blow-torch temperature of 1,100° C. and a gas flow-rate of 1,700 cm³/s, and with the gas containing 70% by volume of oxygen and 30% by volume of sulfur hexafluoride, the surplus thickness had been halved (curve B). The temperature of the blow torch may be as high as the tube-deformation limit temperature, i.e. about 1,700° C.

Naturally, the invention is not limited to the above-described implementation.

In particular, the heating member may be of arbitrary type, provided that it enables the tube to be heated to a high enough temperature over a relatively narrow angular sector. For example, the heating member may be a plasma torch.

Furthermore, the invention may be applied to correcting a geometrical asymmetrical shape of any silica tube to be used for making a preform, regardless of the method used to make the preform.

Finally, any means may be replaced with equivalent means without going beyond the ambit of the invention.

We claim:

1. A method of reducing the eccentricity of a cylindrical silica tube to be used in making a preform having a circular outside surface eccentric to a circular inside surface, thereby forming a thickness which varies continuously throughout the circumference of the cylindrical tube, said method comprising the following steps:

locating a longitudinal generator line of said tube facing out of a greatest circumferential thickness of said tube at a given point on the tube circumference;

preventing the tube from rotating about its axis; and etching, in at least one pass, the inside of the tube with a gas, and decomposing silica, by heating an outside surface portion of the tube along said longitudinal generator line.

2. A method according to claim 1, wherein the gas is one chosen from the group consisting of: $SF_6$, $CF_4$, $CCl_2F_2$, $C_2F_6$, $C_3F_8$, and $SiF_4$.

3. A method according to claim 1, wherein said heating step comprises applying heat over an angular sector of about 60° about the circumference of said silica tube centered on said longitudinal generator line at said given point.

* * * * *